Dec. 15, 1964  R. E. ACKERSON  3,161,005
ELECTRIC ANIMAL TRAINING DEVICE
Filed July 12, 1963  2 Sheets-Sheet 1

INVENTOR.
RICHARD E. ACKERSON
BY
*Sheridan and Ross*
ATTORNEYS

Dec. 15, 1964  R. E. ACKERSON  3,161,005
ELECTRIC ANIMAL TRAINING DEVICE
Filed July 12, 1963  2 Sheets-Sheet 2
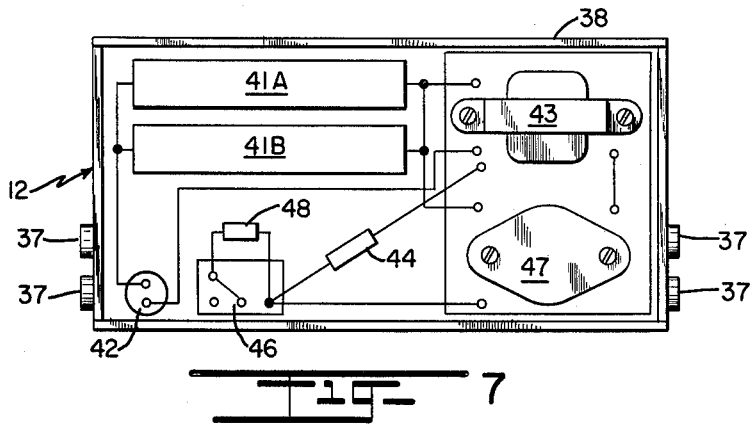
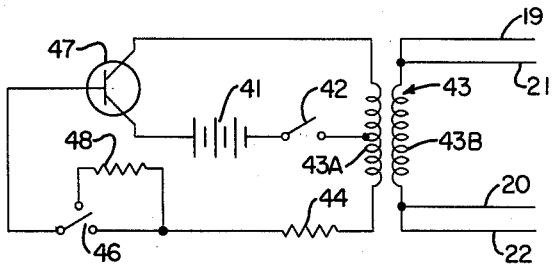
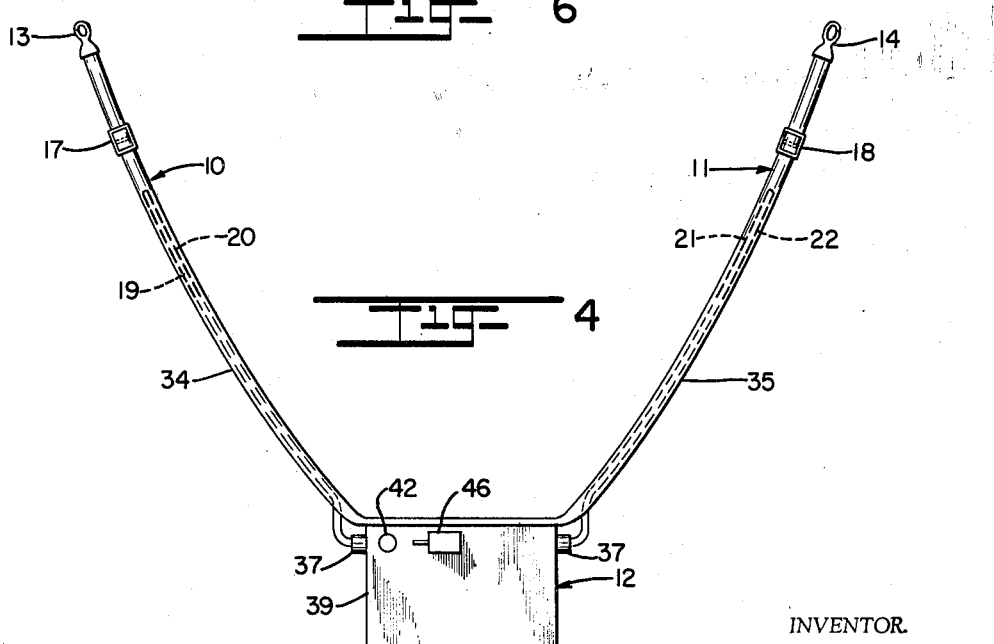
INVENTOR.
RICHARD E. ACKERSON
BY
Sheridan and Ross
ATTORNEYS

United States Patent Office 3,161,005
Patented Dec. 15, 1964

3,161,005
ELECTRIC ANIMAL TRAINING DEVICE
Richard E. Ackerson, 120 Marble, Apt. 304,
Broomfield, Colo.
Filed July 12, 1963, Ser. No. 294,507
4 Claims. (Cl. 54—71)

This invention relates to a device for training animals, and particularly to an electric device for training horses to neck rein, stop and back up, and to control horses during breeding, etc.

Customary methods for training animals in general, and horses in particular, often are relatively very cruel. For example, in training horses to neck rein, one method involves beating the horse about the head with a wide leather paddle or bat several hundred times to train the horse to turn when the rider so orders. Horses trained in this manner to be cow horses usually are retrained after periods of two or three months. During each such training exercise the horse may again be batted about the head several hundred times. These training and retraining exercises often cause a horse to become extremely head shy.

Another training method used to train a cow horse to neck rein involves the use of sharp spurs as the rider wishes the horse to turn. This method often results in badly injured shoulders for the horse, often resulting in permanent injury. In addition, horses which otherwise were very good horses, though somewhat high-spirited, often were ruined for cow horse purposes because they could not be beaten into submission by either the bat or the spur.

Accordingly, it is an important object of this invention to provide a humane animal training device which is capable of more rapidly and more permanently training animals, such as the horse, than has been achieved by the use of prior art methods.

Another object of this invention is to provide an electric training rein for rapidly and efficiently training a horse, such as a cow horse, to neck rein without cutting, bruising, or otherwise injuring or undesirably shying the horse.

A further object is to provide an electric training device to train a horse to stop, back up, etc., such as in training a cow horse to throw a calf; to control a horse, such as a stallion when breeding; and the like.

Additional objects of the invention will become apparent from the following description thereof, which is given primarily for purposes of illustration, and not limitation.

Stated in general terms, the objects of this invention are attained by providing an electric training device comprising: a harness adapted to be secured to the animal, including a pair of spaced parallel electrical leads each provided with a series of spaced contact points and a portable electric current generator for supplying electric current, when desired, to the contact points with sufficient voltage to close an electric circuit through the skin of the animal between opposed contact points on the spaced parallel leads.

A more detailed description of specific embodiments of the invention is given below with reference to the accompanying drawings, wherein:

FIG. 4 is a plan view, with portions broken away, showing the electric training rein of FIGS. 1, 2 and 3 in greater detail;

FIG. 6 is a schematic circuit diagram showing the electric circuitry of the generator; and FIG. 7 is a sectional plan view taken beneath the cover of the electric current generator housing showing the arrangement of the generator components in its housing;

Figure 1:
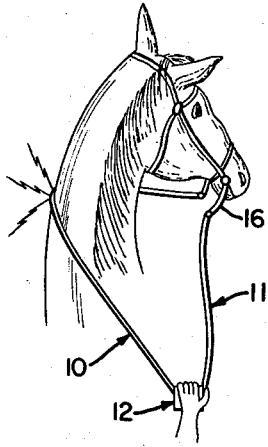
FIG. 1 is a schematic plan view showing the use of the electric training rein embodiment of the invention to train a cow horse to make a right turn.
Figure 2:
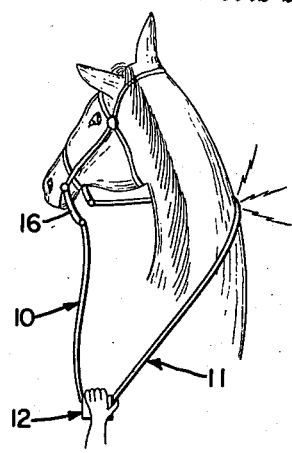
FIG. 2 is a similar view showing its use to make a left turn.
Figure 3:
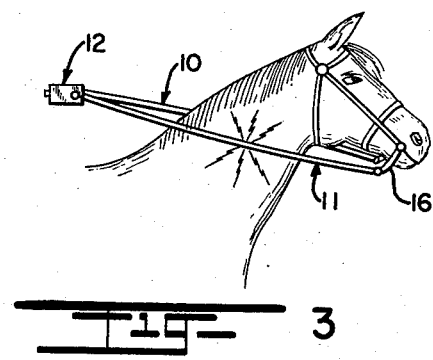
FIG. 3 is a schematic side view showing the use of the device of FIGS. 1 and 2.

The harness employed in the electric training rein specific embodiment of FIGS. 1 to 4 includes, as best shown in FIG. 4, a pair of leather reins 10 and 11, one for each side of the animal, such as a horse, suitably attached to an electric generator unit 12. Each rein 10 and 11 terminates in a standard clip 13 and 14, respectively, for attachment to a bit 16, as shown in FIGS. 1 to 3. The lengths of the reins 10 and 11 can be individually adjusted by rein adjustment buckles 17 and 18 respectively.

Figure 5:
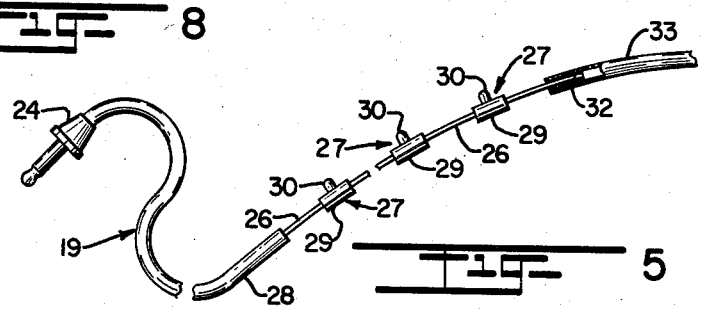
FIG. 5 is a detail plan view showing the construction of one of the spaced parallel electrical leads provided with a series of spaced contact points.

Each rein 10 and 11 is provided with a pair of spaced parallel electrical leads 19 and 20, and 21 and 22, respectively, spaced about one-half inch apart. FIG. 5 shows the details of one of these leads 19. One end of the lead 19 terminates in a plug 24 connected for electrical conduction to a flexible copper cable 26. About half the length of cable 26, reaching to the first of a series of contact points or elements 27, is encased in an insulating tube 28. The tube 28 prevents short-circuiting between the pair of spaced parallel leads 19 and 20 or 21 and 22.

The spaced contact points or elements 27 are made of brass and are spaced about an inch and a quarter from each other. About eight contact points 27 are used with such spacing. The contact points 27 consist of a tubular sleeve portion 29, which fits snugly around cable 26 and a tubular contact portion 30 which is closed and rounded at its outer end and connected to the mid-point of the sleeve portion at its inner end. The contact portions 30 are of sufficient length to pass through holes formed through the leather reins 10 and 11, and beyond about an eighth of an inch to pass through the horses hair and in contact with its skin. The rounded ends of contact portions 30 prevent the horse from feeling the contact portions under normal conditions and, of course, prevent any irritation or pricking of the horse's skin. Lead 19 terminates in a brass termination rod 32 covered with a section 33 of insulating tubing.

This construction of electrical leads 19, 20, 21 and 22 was developed to withstand the tensile stresses placed thereon and to resist the effects of perspiration on the leads. All leather stretches a great deal when placed under tensile stress and the reins 10 and 11, being of considerable length, stretch about an inch while in actual use on a horse. The tubular contact portions 30 of contact points 27 are purposely slidably, though snugly, mounted on cables 26 to move and adjust themselves with stretching and contracting of reins 10 and 11 during actual training of a horse. Cables 26 are made of a sufficient number of strands of copper wire to withstand the tensile stresses resulting from the stretching of reins 10 and 11 without breakage of the cables.

The contact points 27 of reins 10 and 11 are arranged to be positioned in an area adjacent the horse's neck where they make contact with the horse's skin, as best shown in FIGS. 1 to 3. Leads 19 and 20, and 21 and 22 are covered by leather cover strips 34 and 35, respectively. Cover strips 34 and 35 are stitched to reins 10 and 11, respectively, to cover and retain the electrical leads in position on the reins. Any other suitable means, such as snaps, rivets, zippers, etc., can be used to attach cover strips 34 and 35 to reins 10 and 11, respectively. The plugs 24 of leads 19 to 22 are plugged into sockets 37 for electrical connection with the circuitry of generator unit 12.

The metal case 38 of the generator unit 12 is attached to reins 10 and 11 by any suitable means, such as rivets, for example. A leather cover 39 can be wrapped around case 38 of generator 12 and riveted or stitched to reins 10 and 11. Case 38 can be removably enclosed in cover 39 by means of snaps or a zipper. Generator unit 12 is conveniently dimensioned for grasping in the rider's hand, as best shown in FIGS. 1 and 2, while the horse is being trained to make right turns and left turns.

Electric generator unit 12, as shown in FIGS. 6 and 7, employs a battery 41 consisting of two 1.5 volt pencil flashlight cells 41a and 41b. Battery 41 is connected to a push button control switch 42 which, in turn, is bias connected to the primary coil 43a of the transformer 43 (TA43). One end of the primary coil 43a of transformer 43 feeds into a bias feedback loop consisting of a 56 ohm resistor 44, and a single pole double throw 5 watt switch 46, connected to the base of the transistor 47 (2N255). Switch 46 can be used to cut out, or cut in, of the feedback loop to transistor 47, a 15 ohm resistor 48, and thus set the voltage by hand at 125 volts, or 75 volts, respectively. The collector of transistor 47 is connected to the other end of the primary coil 43a of transformer 43 and the emitter of the transistor is connected to battery 41.

One end of the secondary coil 43b of transformer 43, being positive, is connected to one of each of the two pairs of spaced parallel leads 19 and 21, such as leads 19 and 21 and 20 and 22, and the other end of the secondary coil, being negative, is connected to the remaining leads 20 and 22. By using the bias feedback from the primary coil 43, transistor 47 is caused to oscillate to induce a very high voltage in the secondary 43b of the transformer. This results in the production of a ragged wave form, which is desirable in that it is more readily sensed by the horse than a uniform wave form of voltage. This induced voltage is produced silently by generator unit 12, because a vibrator circuit is not employed. The circuit also is characterized by long battery life because it consumes relatively little power.

In operation of the electric training rein embodiment of the invention, as shown in FIGS. 1 to 3, the rider has absolute control at all times and can elect to energize the reins 10 and 11 by merely touching push button control 42 at his finger tips. The touching of push button 42 sends electrical current through both pairs of leads 19 and 20 of rein 10, and leads 21 and 22 of rein 11. The current flow stops the instant the rider release the push button. The rider also has fingertip control of the amount of current used by sliding switch 46 from the 125 volt setting to the 75 volt setting should the horse become wet from sweat and thus more sensitive to the current.

There are two rows of contact points 27 protruding from the insides of each of the reins 10 and 11. These contact points 27 make contact with the left side of the horse's neck, through rein 10, as shown in FIG. 1, when the rider desires the horse to make a right turn. Conversely, as shown in FIG. 2, contact points 27 make contact with the right side of the horse's neck, through rein 11, when the rider wants the horse to make a left turn. In each case the skin of the horse's neck contacted by contact points 27 completes the circuit between opposed contact points of each pair of leads 19 and 20, and 21 and 22. One row of contact points 27 on one of the pair of spaced parallel leads, say lead 19, is electrically positive and the other row of contact points of the other of the pair of leads 20 is electrically negative. The horse's skin between the two sets of spaced parallel contact points is sufficiently conductive to complete the electrical circuits between opposed contact points. The fact that the two sets of contact points 27 are only about one-half inch apart localizes the electrical sensation to the immediate skin area of the horse's neck contacted by either rein 10 or rein 11.

It has been found that horses respond readily to the electric rein of this invention and become very well behaved and gentle animals. They learn to respond to the electrical sensation of the rein and later respond to the ordinary rein when it touches the horse's neck without the electrical sensation. The application of electric current through the rein for training purposes is necessary for only a very short period of training time and the resulting training is much longer lasting than that produced by the prior methods discussed hereinabove. Four or five applications of electric current through the rein often keep a horse reining well for over a year. In addition, if a horse carries his head too high, the use of the electric rain high on the neck causes the horse to carry his head lower, thus making a better cow horse out of him.

Furthermore, the generator unit 12 and the reins 10 and 11 are one single compact unit giving the rider a great advantage in case he is thrown from the horse. There are no extra wires attached to the rider or to the horse to become tangled and resulting in possible injury to the rider, horse or training apparatus, or all three. Also, no extra auxiliary equipment, in addition to the bit and reins, is required. The equipment is strong and rugged and the reins can be twisted, stretched, or otherwise roughly treated, without producing failure or malfunction of the apparatus.

The electric training breast collar embodiment 50 of the invention shown in FIG. 8 employs the same electric generator unit 12 described hereinabove. The generator unit is shown mounted in the pommel of the saddle 56. Plugs 24 electrically connect the two leads 51 and 52 into the generator unit 12 as previously described. Leads 51 and 52 are substantially similar to leads 19 to 22 described hereinabove in connection with the description and illustration of the training rein embodiment of FIGS. 1 to 5, especially FIG. 5. The spaced parallel contact points 53 and 54 of the spaced parallel leads 51 and 52, respectively, are similar to contact points 27 of leads 19 to 22 in structure, construction and operation. The breast collar 50 is attached to saddle 56 at 57 by an extension of the breast collar.

Figure 8:
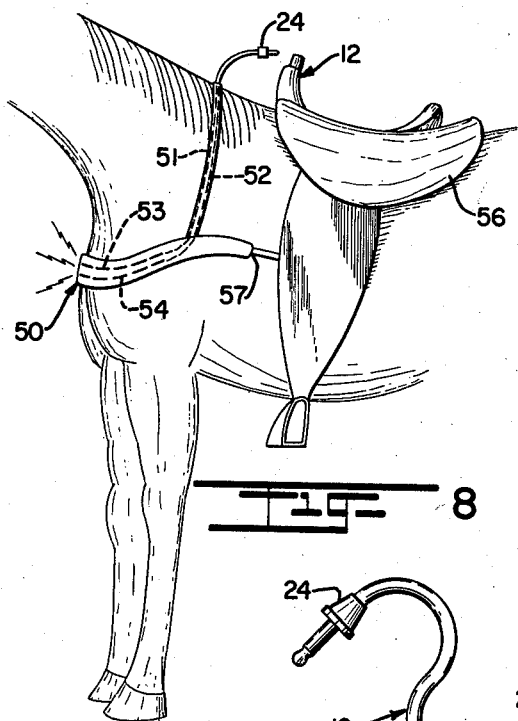
FIG. 8 is a schematic side view showing the use of the electric training breast collar embodiment of the invention to train a cow horse to back up or to train a horse to stop.

The breast collar embodiment of FIG. 8 is used to train a cow horse to back up at the precise instant to throw a roped calf. This again is accomplished by pressing push button switch 42 of generator unit 12. The horse receives the electrical sensation on his chest from contact points 53 and 54 in leads 51 and 52, respectively, in breast collar 50. The electrical sensation causes the horse to move backwardly on command from the rider. This backward movement of the horse forcefully tightens and jerks the rope attached to the roped calf's neck and throws the calf to the ground. This breast collar also can be used to train the horse to stop. The horse quickly learns to automatically stop and when the calf moves, the horse learns to automatically move backwardly.

An electric lead shank embodiment, also using the generator unit 12 and electric leads of the type described above, but threaded into a halter, can be used to train a stallion to control him when rendering breeding services.

Although the invention was described and illustrated hereinabove as applied to horses, it will be understood that the invention can be used to train other animals of the horse family, and animals in general, including wild animals, as well as domesticated animals and beasts of burden of practically all kinds in existence. Obviously, many variations and modifications of the present invention are possible in the light of the teachings given hereinabove. It is, therefore, to be understood that, within the scope of the appended claims, the invention can be practiced otherwise than as specifically described.

What is claimed is:

1. A horse training device comprising a pair of reins adapted for attachment to a horse's bit and disposal of a rein on each side of a horse's neck in conventional manner, said reins constructed to be used in guiding a horse by contacting the horse with one rein only at a time, a pair of spaced electrical leads mounted in each of the reins, a series of spaced apart contact elements attached to each of the electrical leads, said contact elements being adapted to pass through the insides of the reins and through openings provided therein to contact the skin of a horse's neck, and a portable electric current generator connected to the leads for supplying electric current of opposite polarity to each pair of leads in each rein and to the corresponding series of contact elements respectively of each lead with sufficient voltage to close an electric circuit through the skin adjacent said contact elements of a horse's neck between two series of contact elements on a rein contacting a horse's neck, switch means controlled by the rider for selectively inducing current to said contact elements in training of a horse; whereby a horse may be trained to respond to signals given simultaneously with the actuation of contact elements in one rein only contacting the skin of the horse.

2. A horse training device according to claim 1, wherein the said current generator includes a transformer, a battery bias-connected to the primary coil of the transformer, said reins constructed to be used in guiding a horse by contacting the horse with one electrically actuated rein only, a transistor connected to the battery and to the primary coil of the transformer so that the primary coil of the transformer feeds into a bias feedback loop to the transistor, and the secondary coil of the transformer is connected to the leads for supplying the electric current thereto.

3. An animal training device comprising: a member having means for attachment to the animal, a pair of spaced electrical leads mounted in said member, a series of spaced-apart contact elements attached to each of said electrical leads, the contact elements passing through the inside of the member and through openings provided therein to contact the skin of the animal, a portable electric generator connected to the leads for supplying electric current of opposite polarity to said pair of leads in said member and to the corresponding series of contact elements, respectively, of each lead with sufficient voltage to close an electric circuit through the skin adjacent said contact elements of the animal's body between two series of contact elements in the member contacting the animal's body, and switch means controlled by the rider for selectively inducing current to said contact elements for training the animal.

4. The training device of claim 3 in which said contact elements are slidably mounted on their corresponding electrical leads.

References Cited by the Examiner
UNITED STATES PATENTS

| | | | |
|---|---|---|---|
| 452,571 | 5/91 | Holson | 54—1 |
| 470,155 | 3/92 | Holson | 54—1 |
| 987,345 | 3/11 | Cogswell | 54—1 |
| 2,023,950 | 12/35 | Carter | 119—29 |

SAMUEL KOREN, *Primary Examiner.*
HUGH H. CHAMBLEE, *Examiner.*